Patented Feb. 2, 1943

2,310,184

UNITED STATES PATENT OFFICE 2,310,184

SEPARATING OIL FROM CORN GLUTEN

Herman H. Schopmeyer, Hammond, Ind., and Gordon V. Sharps, Chicago, Ill., assignors to American Maize-Products Company, a corporation of Maine No Drawing. Application June 18, 1941, Serial No. 398,626

5 Claims. (Cl. 260—412.2)

This invention relates to the method of separating oil from corn gluten and particularly to the method of producing a corn gluten of abnormally low oil content, improved color, and decreased tendency to develop rancidity on standing or during use.

In the preparation of gluten or like protein mixture from corn, difficulty is encountered due to the oil that remains in the gluten after usual treatment to expel the oil. The oil is associated in some manner with color present in the corn, so that the gluten is more highly colored the larger the proportion of oil present. Furthermore, the presence of unexpelled oil in large proportion leads to the development of rancidity and a disagreeable odor in corn protein when made into corn gluten flour, for instance, and stored in dry form for a considerable time.

As a result, there has been only limited use of corn protein in food products although the protein in some respects is particularly adapted for human food. Also, the use of corn protein such as the gluten as an adhesive in paper coating and paper sizing has been restricted substantially because of the objectionable color associated with the oil content of the gluten.

Because of these disadvantages, various treatments have been proposed to reduce the oil content of gluten below that conventionally present in the processed gluten. Thus it has been proposed to extract oil from gluten by means of a volatile solvent such as hexane. The cost of the solvent and the necessary equipment are large, however, so that there is considerable objection and disadvantage in the use of the solvent extraction process.

We have now discovered a simple method utilizing inexpensive equipment for reducing economically the oil content to a satisfactory low figure and providing a gluten suitable for use in food products, paper coatings, as a material from which zein may be extracted, and for other purposes.

Briefly stated, our invention comprises very fine grinding of corn gluten in contact with water under such conditions that oil separates from the gluten and then separating the oil at a pH substantially greater than 7 and by difference of specific gravities of the oil and water, as, for example, centrifugally. The pH is established on the alkaline side before effecting the separation from the water of the oil released from the gluten, the pH being established at about 8 to 11 and prefererably within the range 8.5 to 10.

In a typical procedure, in which the fine grinding was effected by ball-milling of the gluten in an aqueous alkaline suspension and the separation of the oil released was made at a pH of 9 in a skimming type of centrifuge, the oil content of the remaining gluten was 1.3% on the dry basis. When comparable gluten was ground and processed in like manner, except that the establishment of the pH on the alkaline side for the centrifuging operation was omitted and the pH during centrifuging was 4.4, the oil content of the centrifuged gluten was 2.4%.

The pH may be established by the addition of any suitable freely water-soluble alkali as, for example, ammonium hydroxide, sodium carbonate, or sodium hydroxide. The amount of the alkali added must be adequate to make the composition decidedly alkaline but should not exceed substantially that required to give pH 11 if a satisfactory separation of the oil from purified gluten is to be effected without dissolving an objectionable amount of the gluten.

The alkali added to establish the pH may be introduced into the gluten and water composition at any time prior to the separation based upon difference of specific gravities. Thus, the alkali may be added to the slurry before it is finely ground or to the ground slurry, either before or after dilution with additional water prior to separation of the oil from the water in contact with the ground material. Best results, including uniformity of incorporation of the alkali, are obtained when the alkali is present during the step of grinding the gluten.

The grinding must be thorough and effected while the gluten is in contact with water, so that the oil released from the gluten becomes associated with or is floated away by the water present and so that the oil previously in contact with particles of the gluten is replaced by water. Ball-milling of the wet slurry is a particularly effective and satisfactory method of grinding the gluten in contact with the water. Thus, a slurry including destarched gluten in contact with water in amount adequate to extend as a continuous phase around and between the particles of gluten was ball-milled for 8 to 12 hours, until the remaining material on microscopic examination showed an extremely fine state of subdivision and no substantial proportion of oil cells or globules of oil.

The proportion of gluten during the ball-milling is suitably about 10 to 30 parts for 100 parts of gluten and water. When the concentration is substantially greater than 30%, the mixture is so viscous as to be difficult to handle. At concentrations less than 10% of the gluten, the mixture is so fluid that ball-milling is relatively ineffective.

The ball-milling may be replaced by other fine grinding so long as it is thorough and is effected while the gluten is in contact with an excess of water. Thus, the ball-milling may be substituted by fine grinding in a slurry grinding hammer mill.

After the grinding is effected, sufficient water is added to make the mixture readily flowable in case such an amount of water has not been initially used in making the slurry. We have found it desirable to form first a slurry of a more or less difficultly flowable consistency suitable for ball-milling and, after the milling is completed, to add sufficient additional water to make the final proportion of water about 80 to 95 parts for 100 parts of the mixture of corn gluten and water. Larger proportions of water are unnecessary, whereas proportions of water substantially less than 80% give slurries that may be so thick as to prevent the desired separation of the oil as a layer of low specific gravity when the slurry is subjected to centrifugal skimming. Ordinarily we use a slurry concentration for the final oil separation corresponding to about 6 to 15 parts dry weight of the corn gluten to sufficient water to make the total 100 parts.

The grinding is made at any suitable temperature above the freezing point of water and below the temperature of pasting of any starch present; room temperatures are convenient and satisfactory.

The separation of the oil from the water and finely ground corn gluten may also be made at ordinary temperatures but better separation is obtained when the temperature is elevated substantially, so as to reduce the viscosity of the oil, but is below the temperature of pasting of starch in contact with water. Preferred temperatures for effecting the separation of the oil from the gluten are about 100 to 140° F.

In a typical example of the practice of the invention, the corn gluten mixture from the refining of corn in the conventional process of making starch and by-products was hydrolyzed by heating with an aqueous hydrochloric acid solution of a pH of approximately 1.5 to 2 until the starch was substantially completely converted to soluble form as shown by a negative test for starch on the addition of iodine dissolved in an aqueous solution of potassium iodide. The resulting destarched gluten was then filtered and the remaining filter cake made into a slurry containing about 5 parts of water to 1 part of the gluten on the dry basis. The resulting slurry was ball-milled for 10 hours. The slurry was then mixed with additional water to give a final concentration of solids of about 10% on the dry basis. The diluted slurry was treated with sodium carbonate in amount to establish the pH at 9 and was then centrifuged in a skimming type of centrifuge, the oil which separated as the light layer in the centrifuge being separated.

The corn gluten that contained originally 8.6% of oil on the acid hydrolyzed (largely destarched) basis was thus reduced in oil content to 1.3%.

It is to be understood that the terms "oil" or "oily material" are used herein to include the usual fatty oils, fatty acids, and mixtures of them with each other or with small amounts of soaps and like products.

It will be understood that the details given are for the purpose of illustration and that variations within the spirit of the invention are intended to be included within the scope of the appended claims.

What we claim is:

1. In the separation of oily material from particles of corn gluten, the method which comprises hydrolyzing the starch normally associated with the gluten so as to convert the starch to soluble form, separating the solubilized starch from the gluten, forming a slurry of the destarched gluten in water in amount to form a continuous phase extending around and between the particles of gluten, finely grinding the gluten in contact with the continuous water phase so as to release oil from the gluten, and then separating the released oil from the slurry by difference in specific gravities and at a pH substantially in excess of 7 but below the pH at which the proteins of gluten become soluble.

2. In the separation of oily material from corn gluten, the method which comprises forming a slurry of the gluten and water, finely grinding the gluten in the slurry so as to release oil from the gluten at a temperature below the pasting point of any starch associated with the gluten and then separating the released oil from the slurry by difference in specific gravities of the oil and the other materials present, the separation of the oil being made at a pH of approximately 8 to 11 so as to obtain a more nearly complete removal of the oil from the gluten than is effected at pH values outside the range stated.

3. In the separation of oil from corn gluten, the method which comprises converting the starch of crude corn gluten largely to soluble form, separating the solubilized starch from the remaining gluten, forming a mixture of the destarched gluten and water, finely grinding the gluten in contact with the water at a pH of approximately 8 to 11 so as to release only material from the gluten, and separating the oily material from the remaining mixture by difference of specific gravities.

4. The method described in claim 1, the said slurry containing about 10 to 30 parts of gluten for 100 parts of the slurry, the grinding being effected until oil cells are no longer detectable with the microscope, and the separation of the oil by difference of specific gravities being effected centrifugally.

5. The method described in claim 1, the said slurry containing about 10 to 30 parts of gluten for 100 parts of the slurry, the grinding being effected until oil cells are no longer detectable with the microscope, and the separation of the oil by difference of specific gravities being effected centrifugally at an elevated temperature adapted to reduce substantially the viscosity of the oily material but below the pasting point of starch in contact with water.

HERMAN H. SCHOPMEYER.
GORDON V. SHARPS.